United States Patent
Hsia et al.

(10) Patent No.: US 9,277,604 B2
(45) Date of Patent: Mar. 1, 2016

(54) LINEAR SOLID-STATE LIGHTING WITH BALLAST FREE OF ELECTRIC SHOCK HAZARD

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

( * ) Notice: Subject to any disclaimer, the term of this patent is extended or adjusted under 35 U.S.C. 154(b) by 1 day.

(21) Appl. No.: 14/536,475

(22) Filed: Nov. 7, 2014

(65) Prior Publication Data

US 2015/0061542 A1 Mar. 5, 2015

Related U.S. Application Data

(63) Continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(51) Int. Cl.
| | |
|---|---|
| *H05B 33/08* | (2006.01) |
| *F21V 25/04* | (2006.01) |
| *F21K 99/00* | (2010.01) |
| *F21Y 101/02* | (2006.01) |

(52) U.S. Cl.
CPC ............ *H05B 33/0803* (2013.01); *F21K 9/175* (2013.01); *F21V 25/04* (2013.01); *H05B 33/0806* (2013.01); *F21Y 2101/02* (2013.01); *Y02B 20/341* (2013.01)

(58) Field of Classification Search
None
See application file for complete search history.

(56) References Cited

U.S. PATENT DOCUMENTS

| | | | | |
|---|---|---|---|---|
| 5,691,603 A * | 11/1997 | Nilssen | ............. | H02M 7/53832 315/209 R |
| 6,100,644 A * | 8/2000 | Titus | .................. | H05B 41/2851 315/209 R |
| 6,144,445 A * | 11/2000 | Nilssen | ................ | H05B 41/245 315/209 R |
| 2005/0162101 A1* | 7/2005 | Leong et al. | .................. | 315/291 |
| 2011/0149563 A1* | 6/2011 | Hsia et al. | ..................... | 362/221 |
| 2011/0149564 A1* | 6/2011 | Hsia et al. | ..................... | 362/221 |
| 2011/0176297 A1* | 7/2011 | Hsia et al. | .................. | 362/217.1 |
| 2011/0228526 A1* | 9/2011 | Hartikka | ............ | H05B 33/0803 362/221 |
| 2012/0051040 A1* | 3/2012 | Hsia et al. | ..................... | 362/221 |
| 2012/0146513 A1* | 6/2012 | Radermacher | .......... | F21V 25/04 315/119 |
| 2012/0155074 A1* | 6/2012 | Mori | ....................... | F21V 23/06 362/221 |
| 2012/0181952 A1* | 7/2012 | Roeer | ........................... | 315/307 |
| 2012/0235556 A1* | 9/2012 | Wu | ........................... | F21V 23/04 313/483 |
| 2012/0242241 A1* | 9/2012 | Schmacht | .......... | H05B 33/0884 315/210 |
| 2013/0127327 A1* | 5/2013 | Heil | ........................ | F21V 25/04 313/313 |
| 2013/0241443 A1* | 9/2013 | Ozguc | ..................... | F21K 9/135 315/362 |
| 2014/0055029 A1* | 2/2014 | Jans | ........................ | F21K 9/17 315/74 |

* cited by examiner

*Primary Examiner* — Crystal L Hammond
(74) *Attorney, Agent, or Firm* — Han IP Corporation (57) ABSTRACT

A linear light-emitting diode (LED)-based solid-state lamp using an AC current control scheme and shock protection switches operates normally with an electronic ballast. Due to the use of shock protection switches in the two lamp bases at two opposite ends, the ballast-compatible LED lamp fully protects a person from possible electric shock during initial installation, maintenance, and re-lamping no matter what the rated power and the brand of the LLT lamp are and no matter whether the electronic ballast is existing used ones that may be incompatible with the lamp or faulty, leading to an unacceptable leakage current.

10 Claims, 4 Drawing Sheets

LINEAR SOLID-STATE LIGHTING WITH BALLAST FREE OF ELECTRIC SHOCK HAZARD

CROSS REFERENCE TO RELATED PATENT APPLICATION

This application is a continuation-in-part of U.S. patent application Ser. No. 14/135,116, filed on Dec. 19, 2013, which is a continuation-in-part and claims the priority benefit of U.S. patent application Ser. No. 13/525,249, filed Jun. 15, 2012 and issued as U.S. Pat. No. 8,749,167 on Jun. 10, 2014, which are incorporated by reference in their entirety.

TECHNICAL FIELD

This invention relates to linear light-emitting diode (LED) lamps that work with linear tube lamp fixtures configured to electrically connect to an electronic ballast, and more particularly to an electric shock hazard-free linear LED tube lamp with a shock-protection mechanism.

BACKGROUND

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operated LED lamp by removing/bypassing the ballast. Either retrofit application has its advantages and disadvantages. In the former case, although the ballast consumes extra power, it is straightforward to replace the fluorescent tube without rewiring, which consumers have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumer will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and messy maintenance costs will be unacceptable to the consumers. From energy saving point of view, a ballast constantly draws power, even when the ballast-compatible LLT lamps are dead or not installed. In this sense, any energy saved while using the ballast-compatible LLT becomes meaningless with the constant energy use by the ballast. Eventually, ballast-compatible LLT lamps are more expensive and less efficient than self-sustaining AC mains-operated LLT lamps.

Even with the above mentioned disadvantages of the ballast-compatible LLT lamps, consumers may still choose to use such lamps, considering only very low initial cost associated with a saving for expensive fixture rewiring. When power is applied to an electronic ballast designed to operate fluorescent tube, a high AC voltage starts to be created to ionize the gases inside the gas-filled fluorescent tube before sustaining continuous lighting. When a ballast-compatible LLT lamp used with such a ballast, the high AC voltage originally generated for starting up a fluorescent tube may reach 600 V or even a higher voltage of 950 VAC across a longer lamp. Voltages at these levels represent a strong shock hazard. Person who improperly handles the ballast-compatible LLT lamp by directly touching an exposed bi-pin or electrical connectors can result in severe injury or death. Therefore, a ballast-compatible LLT lamp, as its AC mains-operable counterparts working at 110, 220, or 277 VAC, has a construction issue related to product safety and needed to be resolved prior to wide field deployment. This kind of LLT lamps may fail a safety test, which measures through lamp leakage current. Because the high AC voltage from the ballast applies to both opposite ends of the tube when connected, the measurement of current leakage from one end to the other consistently results in a substantial current flow, which may present a risk of electric shock during re-lamping. Due to this potential shock risk to the person who replaces ballast-compatible LLT lamps in an existing fluorescent tube fixture, Underwriters Laboratories (UL) uses its standard, UL 935, Risk of Shock During Relamping (Through Lamp), to do the current leakage test and to determine if the ballast-compatible LLT lamps under test meet the consumer safety requirement. However, this safety issue related to the ballast-compatible LLT lamps has been ignored because such ballast-compatible LLT lamps can pass an initial test in laboratories with a particular electronic ballast. In fields, when used in fixtures that do not have the same brand of the electronic ballast as used in the lab test or have an existing ballast which has been used for years and may be faulty, such lamps may exist an electric shock hazard when used with the ballast. Ironically, a ballast-compatible LLT lamp has compatibility issues with existing ballasts in the fixtures not only to operate the lamp but to show an electric shock hazard. The safety issue needs to be resolved to protect consumers from being injured during relamping.

To verify that there exists such a ballast-dependent electric shock hazard, the inventors have measured leakage current from an exposed bi-pin of a ballast-compatible LLT lamp with the other bi-pin connected to the ballast for various combinations of different brands of electronic ballasts and ballast-compatible LLT lamps with a little different power ratings. In the experiments, three types of brand new and one type of used electronic ballasts and three types of brand new ballast-compatible LLT lamps are used. The results show that all the three lamps used with the used ballast have the largest leakage current among the tests, which could severely burn a person's finger skin although the ballast can normally operate all the three ballast-compatible LLT lamps under test. Other combinations also show unacceptable electric shock levels, burning the tester's finger skin to a certain degree. UL 935 suggests that a measurement instrument with body impedance model and frequency sensitive network be used to measure electric shock current. However, passing maximum meter indicating unit (M.I.U.) of 7.07 required in UL 935 does not mean that there is no shock hazard. As defined in UL 8750, a risk of electric shock exists between any two conductive parts or between a conductive part and earth ground if the open circuit potential is higher than 42.4 V peak AC, and the available current flow between them exceeds 0.5 mA as determined by the leakage current measurement test. In one experiment using a brand new electronic ballast and a new ballast-compatible LLT lamp, an open circuit potential of 75 V rms AC appears at the exposed bi-pin and earth ground, and a current that flow between them reaches 131 mA, well above 0.5 mA limit. The voltage and current at this level represents an unacceptable electric shock hazard to users or installers.

Although electrical power to the entire fixture needs to be disconnected when servicing an existing fluorescent fixture and three or four ballast-compatible LLT lamps in the fixture, it is not always practical in situations where a large number of fixtures are controlled from the same power switch such as in open office areas. In this case, risk of electric shock is unavoidably high to the person who does servicing. Fluorescent lamp ballasts can fail in many failure modes such as leaving and operating burned-out lamps in the fixture, using the wrong size lamps, improper wiring, incorrect line voltage, operating at temperatures below or above the rated limits, power surges, and even the age. However, not all the ballasts fail and stop functioning-many just overheat. So a severe problem occurs when a ballast is still functioning but has significant amount of leakage current that may introduce a shock hazard, and when a user tries to replace a ballast-compatible LLT lamp in the fixture that has such ballast, without knowing the risk of such an electric shock. Many even mistakenly believe that through the electronic ballast as an electrical buffer, there is no risk of electric shock for an exposed bi-pin when the other bi-pin is installed and energized.

When there are various kinds of LLT lamps on the LED lighting market, there are various kinds of configurations of linear fixtures, and misapplications of power supply may occur. For example, installing a ballast-compatible LLT lamp in the fixture that is intended for an application of AC mains of 277 V may burn some of the electronic components not rated at 400 V peak in the lamp, which create a fire hazard. Above all, a power source of AC mains at 277 VAC is different from that of an electronic ballast, which has an internal protection circuitry to shut down the operation of the ballast once short circuit is detected. So the design of a ballast-compatible LLT lamp must take this into account by removing such a risk.

SUMMARY

In one aspect, a ballast-compatible linear LED tube (LLT) lamp comprises: an elongated housing comprising two ends, each end comprising a bi-pin used to receive power from an electronic ballast; an LED printed circuit board (PCB) with a plurality of LEDs in LED arrays; an LED driver; and a shock protection mechanism implemented with two shock protection switches, is used to replace a fluorescent tube in an existing tube lamp fixture that has an existing electronic ballast. A general myth is that through the electronic ballast, there is no risk of electric shock for an exposed bi-pin when the other bi-pin is installed and energized. In fact, the electric shock does happen if no shock protection mechanism is adopted in the ballast-compatible LLT lamp. When such a ballast-compatible LLT lamp with the shock protection mechanism employed is installed in the fixture, the shock protection switches on both ends of the LLT lamp can effectively block an electric current flowing from the installed bi-pin that is energized, through the LED driver and the LED arrays to an exposed bi-pin not yet installed in fixture sockets, no matter what ballast brand, and rated power are and no matter whether the electronic ballast is existing used one that may have unacceptable leakage current. Therefore, no high AC voltage or leakage current will possibly appear at the exposed bi-pin during initial installation, maintenance, or re-lamping, thus completely eliminating risks of electric shocks.

The LED driver of the ballast-compatible LLT lamp comprises an interface module that has two termination devices and a frequency sensitive circuit, a voltage sensing and control module, and an LED driving module. The frequency sensitive circuit possesses frequency-dependent impedance employed to control input current with frequency in a range of 35~50 KHz from the electronic ballast in the fixture used, which substantially controls power of LED arrays. When such a ballast-compatible LLT lamp is accidently installed in a fixture intended for AC mains applications, the frequency sensitive circuit can effectively oppose 60 Hz current flowing into the voltage sensing and control module, which in turn suppresses a dangerously high voltage to be generated, thus eliminating possible damages to the electronic components in the LED driving module if there is no voltage limiting circuit therein. In one embodiment, each of the two termination devices in the interface module is connected between the two pins of the bi-pins through each of the shock protection switches to help the electronic ballast complete its preheat and arc discharge process and function to turn on the ballast-compatible LLT lamp normally. With this scheme, consumers can safely install such a ballast-compatible LLT lamp in an existing lamp fixture used to operate a conventional fluorescent tube no matter what the electronic ballast type is instant-start type or rapid-start type, without operational uncertainty and electric shock hazard. That is, if an instant-start electronic ballast exists in the fixture the lamp will operate normally no matter whether the lamp sockets in the fixture are shunted or not, and no matter how the lamp sockets are wired. In one embodiment, AC power from an electronic ballast coupling to any two pins of four pins in the LLT lamp can operate the lamp without operational uncertainty. If a rapid-start electronic ballast is in the fixture, the ballast-compatible LLT lamp will still work with the two termination devices that provide preheat and arc discharge paths to turn on the ballast-compatible LLT lamp. When the electronic ballast dies, consumers may choose to replace it with a new one and relamp such ballast-compatible LLT lamps in the fixture without worrying about possible electric shock hazard that may occur when they accidentally touch an exposed bi-pin on the other end of the lamp.

The claims and advantages will be more readily appreciated as the inventive concept becomes better understood by reference to the following detailed description and the accompanying drawings showing exemplary embodiments, in which like reference symbols designate like parts. For clarity, various parts of the embodiments in the drawings are not drawn to scale.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

In FIGS. 1-4, a ballast-compatible LLT lamp employs double shock protection switches to operate with an electronic ballast. The ballast-compatible LLT lamp 100 (FIG. 1 and FIG. 4) or 101 (FIG. 2 and FIG. 3) comprises a housing having two ends; two lamp bases 660 and 760 having respective bi-pins 250 and 350 at each end of the housing; two actuation mechanisms 640 and 740 of double shock protection switches 610 and 710 respectively in the two lamp bases 660 and 760; an LED driver 801; and LED arrays 807. The LED driver 801 comprises an interface module 802, a voltage sensing and control module 805, and an LED driving module 806. The interface module 802 has four interface ports 402, 404, 406, and 408.

The protection switch 610 at the lamp base 660 is of double-pole single-throw type, which consists of one actuation mechanism 640 and two sets of electrical contacts. In the first set, the first electrical contact connects to the upper pin of the bi-pin 250 at an electrical contact 401 whereas the second electrical contact connects to the interface port 402 of the interface module 802. In the second set, the first electrical contact connects to the lower pin of the bi-pin 250 at an electrical contact 403 whereas the second electrical contact connects to the interface port 404 of the interface module 802. Similarly, the shock protection switch 710 at the other lamp base 760 comprises one actuation mechanism 740 and two sets of electrical contacts with electrical contacts 405 and 407 respectively connecting to the two pins of bi-pin 350 and the interface ports 406 and 408 of the interface module 802.

Figure 1:
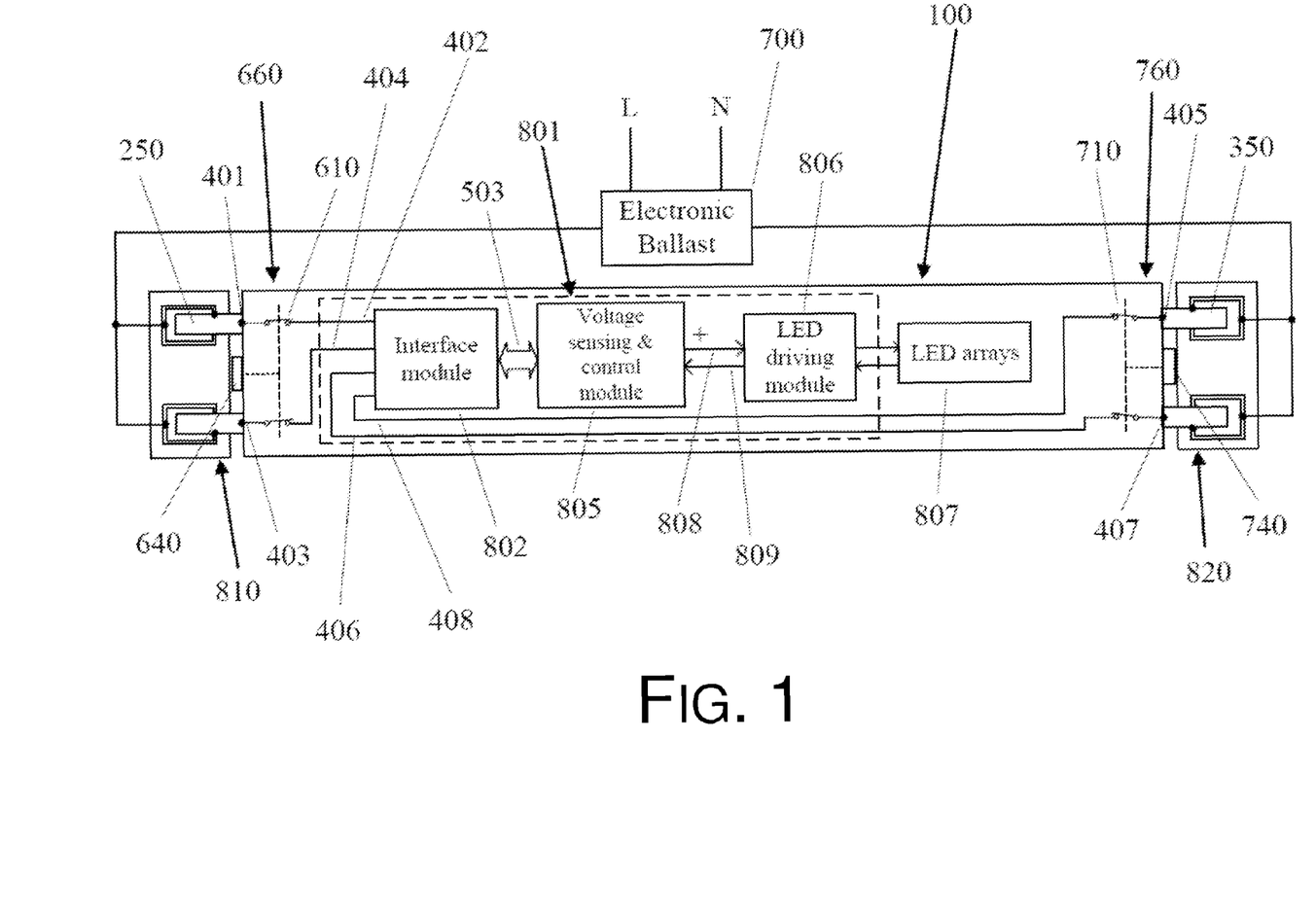
FIG. 1 is a block diagram of a ballast-compatible LLT lamp employing double shock protection switches operable with an instant-start electronic ballast according to the present invention, in which the lamp sockets are shunted.

FIG. 1 is a block diagram of a ballast-compatible LLT lamp employing double shock protection switches operable with an instant-start electronic ballast according to the present invention, in which the lamp sockets are shunted. The lamp bases 660 and 760 respectively use the bi-pins 250 and 350 to connect to the instant-start electronic ballast 700 through the shock protection switches 610 and 710 to the interface module 802. The shock protection switches 610 and 710 are normally "off" when the lamp is not installed in fixture lamp holders 810 and 820. When actuated (pressed in, twisted on, etc.), the actuation mechanisms 640 and 740 respectively actuate the protection switches 610 and 710 and turn on the connection between the instant-start electronic ballast 700 and the interface module 802. The interface module 802 manages to provide an input impedance similar to a fluorescent tube to activate the ballast operation, receives power from the instant-start electronic ballast 700, and adjusts the ballast output current to flow into the voltage sensing and control module 805 where the AC current is guided to flow into an LED driving module 806 which powers the LED arrays 807. The interface module 802 also checks the frequency of the received voltage. If a high frequency such as 35~50 KHz generated from the instant-start electronic ballast 700 is detected, the interface module 802 allows the current to flow into the voltage sensing and control module. When the ballast-compatible LLT lamp is accidently installed in an AC mains operable fixture, the interface module 802 can detect the frequency of 50~60 Hz and oppose the current flowing into the voltage sensing and control module 805, thus deactivating operation of the LED driving module 806.

When someone tries to install the ballast-compatible LLT lamp 100 in the fixture with the instant-start electronic ballast 700 wired with the lamp sockets shunted as in FIG. 1, she or he needs to first insert, for example, the lamp base 660 to the fixture lamp holder 810. The actuation mechanism 640 is actuated to turn on both sets of electrical contacts on the shock protection switch 610 such that a high start-up voltage generated from the instant-start electronic ballast 700 appear at the interface ports 402 and 404 of the interface module 802. Although no current flowing into the voltage sensing and control module 805 because the lamp base 760 has not yet been inserted into the lamp holder 820 to form a current return path, the voltage sensing and control module 805 is energized, so as the LED driving module 806 and the LED arrays 807. If no shock protection switch 710 is in the lamp base 760, the high start-up voltage generated from the instant-start electronic ballast 700 through the interface module 802, the voltage sensing and control module 805, the LED driving module 806, and the LED arrays 807 will appear at the bi-pin 350. When the person touches the bi-pin 350, a leakage current flowing through her or his body to the earth ground may burn her or his finger skin to a degree depending on how large the leakage current is. The leakage current varies from ballast to ballast and from ballast-compatible LLT lamp to lamp because their internal circuit configurations and rated power are different. If the shock protection switch 710 is in the lamp base 760 as shown, and as long as it is not inserted into the lamp holder 820, the actuation mechanism 740 will not be actuated. So the shock protection switch 710 remains "off", disconnecting any electric current flowing from the interface module 802, to the exposed bi-pin 350, and thus no leakage current can possibly flow out—no electric shock hazard. When the person who does the installation further inserts the lamp base 760 into the lamp holder 820, the actuation mechanism 740 is actuated, which turns on the protection switch 710, thus connecting the bi-pin 350 to the interface ports 406 and 408 of the interface module 802. When the protection switch 710 is "on", an electric potential difference exists between the interface ports 402 and 406, and an electric current can flow from the input/output port 503 of the voltage sensing and control module 805 to the LED driving module 806 via input/output port 808 of the LED driving module 806, further to the LED arrays 807 followed by a current return path from the LED driving module 806, through the current return port 809 of the LED driving module 806, the input/output port 503 of the voltage sensing and control module 805, and the interface ports 406 and 408 to the bi-pin 350, thus delivering power to the LED driving module 806, which then powers and lights up the LED arrays 807.

Figure 2:
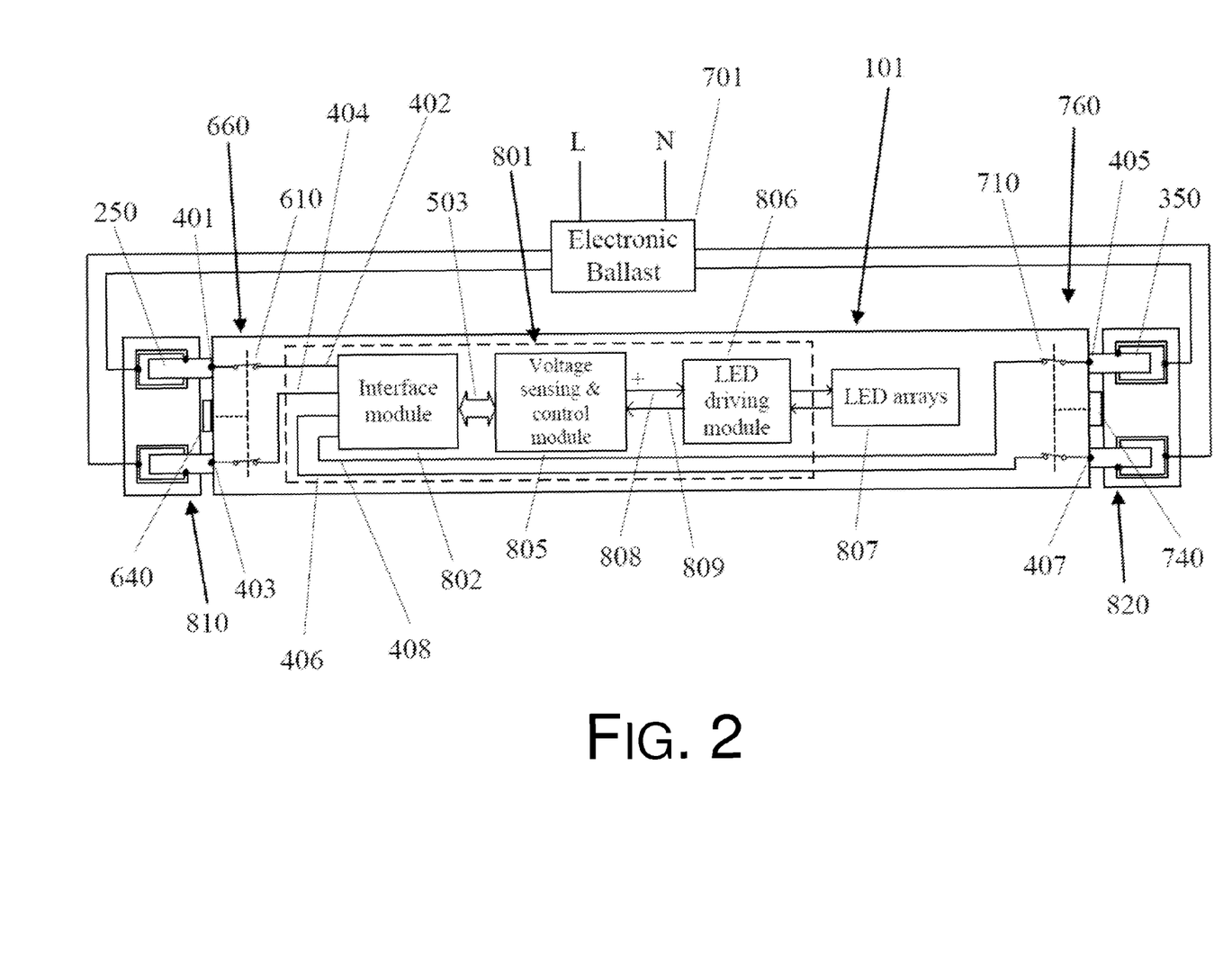
FIG. 2 is a block diagram of a ballast-compatible LLT lamp employing double shock protection switches operable with a rapid-start electronic ballast according to the present invention, in which the lamp sockets are non-shunted.

FIG. 2 is a block diagram of a ballast-compatible LLT lamp employing double shock protection switches operable with a rapid-start electronic ballast according to the present invention, in which the lamp sockets are non-shunted. The lamp bases 660 and 760 respectively use the bi-pins 250 and 350 to connect to the rapid-start electronic ballast 701 through the shock protection switches 610 and 710 to the interface module 802. The shock protection switches 610 and 710 are normally "off" when the lamp 101 is not installed in the fixture lamp holders 810 and 820. When actuated (pressed in, twisted on, etc.), the actuation mechanisms 640 and 740 respectively actuate the protection switches 610 and 710 and turn on the connection between the rapid-start electronic ballast 701 and the interface module 802. The rapid-start electronic ballast 701 has two pairs of wires, each connecting to one of the two bi-pins 250 and 350 of the ballast-compatible LLT lamp 101. When both ends are installed in the fixture, both shock protection switches 610 and 710 are actuated to turn on the connection between the rapid-start electronic ballast 701 and the ballast-compatible LLT lamp 101. The interface module 802 further provides two electric current paths for the rapid-start electronic ballast to function properly in its filament preheat and arc discharge process and to end up with a rated current provided to the lamp 101 to continuously operate. As in the LLT lamps working with the instant-start electronic ballast, the interface module 802 further limits the AC current from the rapid-start electronic ballast 701 and opposes the AC current directly from the AC mains to flow into the voltage sensing and control module 805. The two current paths provided in the interface module 802 are needed to avoid turn-on failure occurred in the ballast-compatible LLT lamp 101 working with the rapid-start electronic ballast 701. Similar to an instant-start ballast which create a high start-up voltage, a rapid-start ballast produces a high preheat and arc discharge voltage. If no shock protection switch 710 is in place as shown in FIG. 2, this high voltage can energize the LED driving module 806 and the voltage sensing and control module 805 and appear between the bi-pin 350 and the earth ground—an electric shock hazard, if two pins of the bi-pin 350 in the lamp base 760 are not in the sockets of the fixture lamp holder 820. Note that the ballast-compatible LLT lamps 100 and 101 in FIGS. 1 and 2 may have the same internal configuration. In that case, the interface module 802, the voltage sensing and control module 805, and the double shock protection switches 610 and 710 adopted in such a ballast-compatible LLT lamp can work with either instant-start or rapid-start electronic ballast free of operational uncertainty and electric shock hazard. For illustration purpose, the shock protection switches 610 and 710 are both of contact type, which can be a snap switch, a push-button switch, a micro switch, a twist-on switch, a rotary switch, or any homemade switches that perform switch functions. In reality, the shock protection switch can be of a non-contact type, such as electro-mechanical, electromagnetic, optical, electro-optic, fiber-optic, infrared, or wireless based. Furthermore, the non-contact shock protection switch can be of a sensing type, having a proximity control with a sensing range up to 8 mm.

Figure 3:
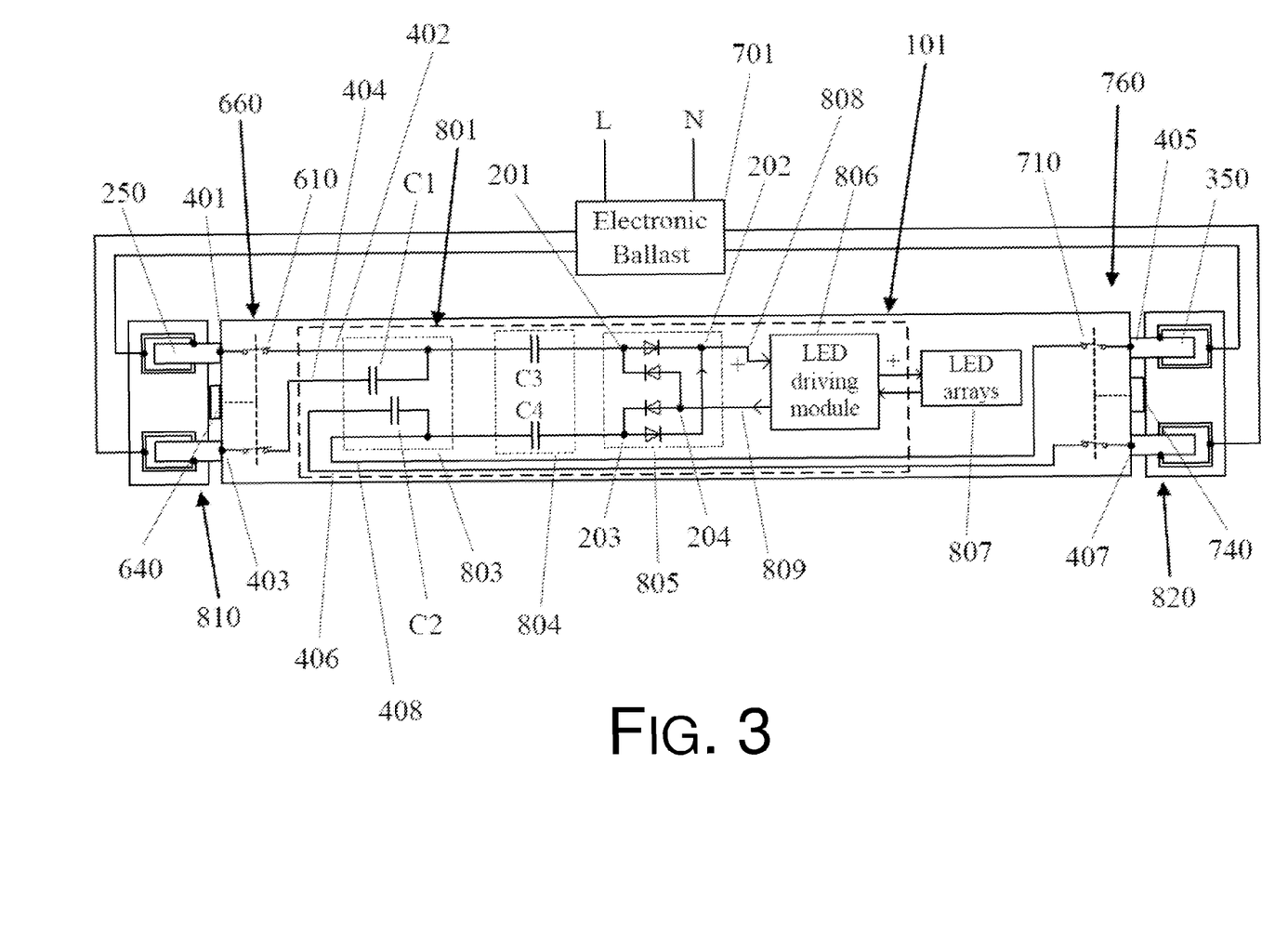
FIG. 3 is a preferred embodiment of a ballast-compatible LLT lamp employing double shock protection switches operable with a rapid-start electronic ballast according to the present invention.

FIG. 3 is a preferred embodiment of a ballast-compatible LLT lamp employing double shock protection switches operable with a rapid-start electronic ballast according to the present invention. The interface module 802 in FIG. 2 is embodied by two termination devices 803 and a frequency sensitive circuit 804. The two termination devices 803 are embodied by two capacitors C1 and C2, each connecting the two pins of the bi-pins 250 and 350 through the shock protection switches 610 and 710. The two capacitors C1 and C2, each terminated at each end of the lamp are used to provide filament preheat and arc discharge path ensuring proper electronic ballast functions. The frequency sensitive circuit 804 comprises two capacitors C3 and C4, each connecting one pin of the bi-pins 250 and 350 through the shock protection switches 610 and 710 to the voltage sensing and control module 805. The two capacitors C3 and C4 are a frequency sensitive component, of which the reactance is $-1/(2\pi fC)$, where f is a frequency of the voltage across its terminals, and C is a capacitance. For a frequency of 40 KHz for an AC voltage from an electronic ballast, the impedance across each capacitor C3 or C4 with a specific capacitance is hundreds of ohms, which can be used to control input current flowing into the voltage sensing and control module 805, thus conditioning power of LED arrays. For a frequency of 60 Hz of a voltage from the AC mains, the impedance can be as high as hundreds of kilo-ohms, thus significantly reducing the electric current to flow into the voltage sensing and control module 805. In FIG. 3, the voltage sensing and control module 805 is embodied by four diodes used to guide electric current to flow by sensing electrical potentials. The four diodes are interconnected with four input/output ports 201, 202, 203, and 204. When an AC voltage from the bi-pins 250 or 350 appears between the input/output ports 201 and 203, the diodes sense electrical potential difference between the neighboring input/output ports, for example, 201 and 202, 201 and 204, 203 and 204, and 203 and 202, and conduct the electric current only when forward biased. In this sense, the input/output port 202 always has a high electrical potential with respect to a low electrical potential at the input/output port 204. Thus, the current flows into the high electrical potential port 808 of the LED driving module 806 and further delivers to LED arrays 807. The current returns through the low electrical potential port 809 of the LED driving module 806 to the input/output port 204 of the voltage sensing and control module 805. Then the diodes sense the electrical potential and guide the current to further flow out to the bi-pin 350 or 250, completing delivery of power to the LED arrays 807. As shown in FIG. 3, if the lamp base 660 is first installed in the fixture lamp holder 810 and if no shock protection switch 710 is in the lamp base 760, the high preheat and arc discharge voltage from the rapid-start electronic ballast can energize the LED driving module 806 and the voltage sensing and control module 805 and appear between the bi-pin 350 and the earth ground—an electric shock hazard, if two pins of the bi-pin 350 in the lamp base 760 are not in the sockets of the fixture lamp holder 820.

In FIG. 3, although the electronic ballast 701 is of a rapid-start type, the ballast-compatible LLT lamp 101 can also work in an instant-start electronic ballast. The instant-start electronic ballast has only one pair of wires, each of the two wires connecting to one of the lamp sockets in the fixture lamp holders 810 and 820. When the lamp sockets are shunted, the AC voltage provided by the electronic ballast can directly bypass the capacitors C1 and C2 and appear at the input ports of the frequency sensitive circuit 804, operating the LED driving module 806 and powering the LED arrays 807. If the lamp sockets are not shunted, and the two wires from the instant-start electronic ballast are, for example, connected to lower pins of the bi-pins 250 and 350, the high frequency AC voltage provided by the electronic ballast can still pass the capacitors C1 and C2 due to the frequency-impedance feature of the capacitors used and reach the input ports of the frequency sensitive circuit 804, thus operating the LED driving module 806 and powering the LED arrays 807.

Figure 4:
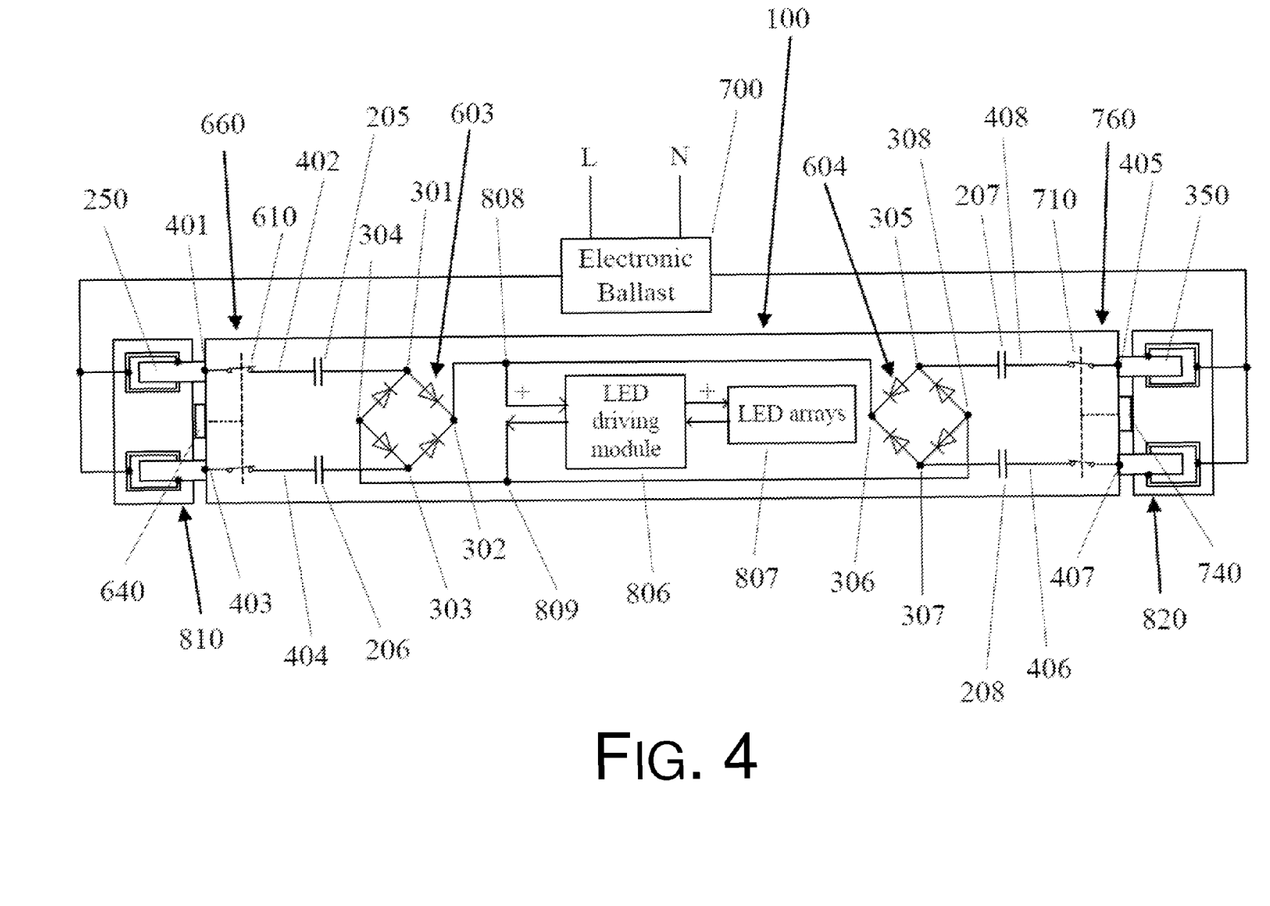
FIG. 4 is another embodiment of a ballast-compatible LLT lamp employing double shock protection switches operable with an instant-start electronic ballast according to the present invention.

FIG. 4 is another embodiment of a ballast-compatible LLT lamp employing double shock protection switches operable with an instant-start electronic ballast according to the present invention. The interface module 802 is embodied by four capacitors 205, 206, 207, and 208, each connecting to one of the four pins in the bi-pin 250 and 350 via the shock protection switches 610 and 710. The four capacitors 205, 206, 207, and 208 in interface module 802 are frequency sensitive devices used to control AC current to flow into the voltage sensing and control module 805. The voltage sensing and control module 805 is embodied by two bridge rectifiers 603 and 604. The first bridge rectifier 603 has four diodes interconnecting at four input/output ports 301, 302, 303, and 304. Similarly, in the second bridge rectifier 604, the four diodes are interconnected at four input/output ports 305, 306, 307, and 308. The two bridge rectifiers 603 and 604 are electrically connected in parallel such that the positive and the negative input/output ports 302 and 304 of the first bridge rectifier 603 respectively connect to the positive and the negative input/output ports 306 and 308 of the second bridge rectifier 604. The common positive and negative input/output ports of the two bridge rectifiers 603 and 604 are then respectively connected to the two input/output ports 808 and 809 of the LED driving module 806. Furthermore, the eight diodes in the two bridge rectifiers are partially paired to perform a full wave rectification of the AC voltage from the electronic ballast 700 in a lamp fixture. When an AC voltage from the instant-start electronic ballast is applied at bi-pins 250 and 350, an electrical potential difference appears between the input/output ports 302 and 308 or between the input/output ports 306 and 304, depending on the positive or the negative cycle of the AC voltage applied at the bi-pin 250 or the bi-pin 350. If the positive cycle of the AC voltage appears at the bi-pin 250, the two diodes of the first bridge rectifier 603 facing the second bridge rectifier 604 are forward biased and conduct the current while the two diodes of the second bridge rectifier 604 facing the first bridge rectifier 603 are reverse biased and prohibit the current flow across them. The current is then forced to flow into the high electrical potential port 808 of the LED driving module 806, to the LED arrays 807, returning to the low electrical potential port 809 of the LED driving module 806. Since the positive cycle of the AC voltage is from the bi-pin 250, the two diodes of the first bridge rectifier 603, interconnected at the input/output ports 304, are reverse biased and prohibit the current flow across them while the two diodes of the second bridge rectifier 604, interconnected at the input/output ports 308, are forward biased and conduct the current flowing to the bi-pin 350 through the shock protection switch 710. Similarly for the negative cycle of the AC voltage, the current flows from the bi-pin 350 to the bi-pin 250, thus completing a power delivery to the LED arrays 807. In FIG. 4, each of the capacitors 205, 206, 207, and 208 in the interface module 802 is connected between one of two sets of the electrical contacts of each shock protection switch and one of the input/output ports of each bridge rectifier. The embodiment of the two bridge rectifiers 603 and 604 enables the ballast-compatible lamp to receive power from any two pins of the bi-pins 250 and 350 and to operate the lamp normally. As other embodiments mentioned in this patent application, if the lamp base 660 is first installed in the fixture lamp holder 810 and if no shock protection switch 710 is in the lamp base 760, the high start-up voltage from the instant-start electronic ballast 700 can energize the LED driving module 806 and the bridge rectifiers 603 and 604 and appear between the bi-pin 350 and the earth ground—an electric shock hazard, if the two pins of the bi-pin 350 in the lamp base 760 are not in the sockets of the fixture lamp holder 820.

In the embodiment shown in FIG. 3, each of the capacitors C1, C2, C3, and C4 may have a resistor connected in parallel as a snubber circuit for stable operation of the ballast-compatible LLT lamp and may comprise two or more capacitors. Each diode may comprise two or more diodes connected in series. In FIG. 4, each of the capacitors 205, 206, 207, and 208 in the interface module 802 may comprise two or more capacitors, and the capacitors 205 and 206 or the capacitors 207 and 208 may be removed from the interface module 802. All of these and other modifications are possible art without departing from the scope of this invention. Furthermore, although embodied by a bridge rectifier and passive electronic components, the voltage sensing and control module 805 and the interface module 802 in the LED driver 801 can be of non-hardware type, implemented by an application-specific integrated circuit (ASIC), a field-programmable gate array (FPGA), or a microcontroller.

Whereas preferred embodiments of the invention have been shown and described, it will be realized that any other alterations, modifications, and improvements may be made thereto without departing from the scope of the following claims. Another interface module and voltage sensing and control mechanism in a ballast-compatible LED linear tube lamp using various kinds of combinations to accomplish the same or different objectives could be easily adapted for use from the present invention. Accordingly, the foregoing description and attached drawings are by way of example only, and are not intended to be limiting.

In the present invention, double shock protection switches are incorporated into a ballast-compatible LLT lamp for operating with an electronic ballast. Because leakage current flowing from a live bi-pin, through the LED driver, to an exposed bi-pin is interrupted by the double shock protection switches, the ballast-compatible LLT lamp is electric shock hazard-free.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

For the purposes of this disclosure and the claims that follow, the terms "coupled" and "connected" may have been used to describe how various elements interface. Such described interfacing of various elements may be either direct or indirect.

What is claimed is:

1. A linear light-emitting diode (LED) tube lamp, comprising:
a housing comprising two ends;
a light-emitting diode printed circuit board (LED PCB), the LED PCB comprising LED arrays fixed thereon;
two lamp bases respectively connected to the two ends of the housing, each lamp base comprising a shock protection switch and a bi-pin with the bi-pin comprising two pins protruding outwards; and an LED driver comprising interface ports receiving power from an electronic ballast through the bi-pins and the shock protection switches in the two lamp bases and powering the LED arrays;

wherein the shock protection switch of each of the lamp bases comprises:

two sets of electrical contacts, each set comprising at least two electrical contacts with one electrical contact electrically connected to one of the two pins of the bi-pin and another electrical contact electrically connected to one of the interface ports of the LED driver; and at least one switch actuation mechanism comprising a front portion protruding outwards;

wherein, in each lamp base, when the shock protection switch is off, the bi-pin is not electrically connected to the LED driver, and wherein, in each lamp base, when the front portion of the switch actuation mechanism is pressed in or twisted on by installing the bi-pin of the lamp base in a lamp socket, the shock protection switch is actuated, and the electrical contacts of each of the two sets of electrical contacts are electrically connected to electrically connect the bi-pin to the LED driver.

2. The linear LED tube lamp of claim 1, wherein the LED driver comprises:

an interface module comprising at least one frequency sensitive device and two termination devices, each termination device connecting between the two pins of each of the bi-pins through each of the shock protection switches;

a voltage sensing and control module provided to receive power from the interface module and to guide the electric current flow; and an LED driving module connected to the LED arrays.

3. The linear LED tube lamp of claim 2, wherein the at least one frequency sensitive device comprises at least one capacitor connecting between one of the termination devices and the voltage sensing and control module.

4. The linear LED tube lamp of claim 2, wherein the voltage sensing and control module comprises at least one full-wave rectifier comprising at least four diodes.

5. The linear LED tube lamp of claim 2, wherein the interface module and the voltage sensing and control module are of non-hardware type, implemented by an application-specific integrated circuit (ASIC), a field-programmable gate array (FPGA), or a microcontroller.

6. The linear LED tube lamp of claim 1, wherein each of the shock protection switches is of a contact type.

7. The linear LED tube lamp of claim 6, wherein each of the shock protection switches is a snap switch, a push-button switch, a micro switch, a twist-on switch, or a rotary switch.

8. The linear LED tube lamp of claim 1, wherein each of the shock protection switches is of a non-contact type.

9. The linear LED tube lamp of claim 8, wherein each of the shock protection switches is electro-mechanical, electromagnetic, optical, electro-optic, fiber-optic, infrared, or wireless based.

10. The linear LED tube lamp of claim 8, wherein each of the shock protection switches is of a sensing type, comprising a proximity control with a sensing range up to 8 mm.

\* \* \* \* \*